United States Patent [19]

Oprandi et al.

[11] 4,337,532
[45] Jun. 29, 1982

[54] SYSTEM FOR CONTROLLING THE CHANGE OF READ SIDE FOR AN OPTICAL READER FOR AN INFORMATION CARRIER

[75] Inventors: Pierre Oprandi; René Romeas, both of Paris, France

[73] Assignee: Thomson-Brandt, Paris, France

[21] Appl. No.: 154,435

[22] Filed: May 29, 1980

[30] Foreign Application Priority Data

May 31, 1979 [FR] France .................................. 79 13981

[51] Int. Cl.³ .................................................. G11B 7/00
[52] U.S. Cl. .......................................... 369/45; 369/50; 369/56; 369/94
[58] Field of Search ....................... 369/45, 44, 46, 106, 369/124, 94; 365/127, 215, 234; 250/201, 202

[56] References Cited

U.S. PATENT DOCUMENTS

| | | | |
|---|---|---|---|
| 3,946,367 | 3/1976 | Wohlmut et al. | 369/45 |
| 3,974,327 | 8/1976 | Van Dijk | 179/100.3 V |
| 4,128,847 | 12/1978 | Roullet et al. | 369/45 |
| 4,243,848 | 1/1981 | Utsumi | 369/124 |

Primary Examiner—James W. Moffitt
Assistant Examiner—Donald McElheny, Jr.
Attorney, Agent, or Firm—Oblon, Fisher, Spivak, McClelland & Maier

[57] ABSTRACT

System for changing the read side on a transparent carrier carrying information recorded on both sides. Reading is carried out by means of an optical device focusing a light beam onto one preselected side, incorporating a feedback loop servomechanism which maintains constant the distance between the optical device and the recorded surface of the disk. The servomechanism is attached or connected by the detection of the high frequency electrical signal representing the recorded information. The system opens the feedback loop when, after the read side change control, the high frequency signal drops below a predetermined threshold. A side jump control pulse which imparts an accelerated movement towards the other side to the focusing device is generated synchronously with the loop opening. The high frequency signal again rises above the predetermined threshold when the light beam focusing point reaches the opposite side. At this time, the loop is closed again and a decelerating pulse is generated.

7 Claims, 9 Drawing Figures

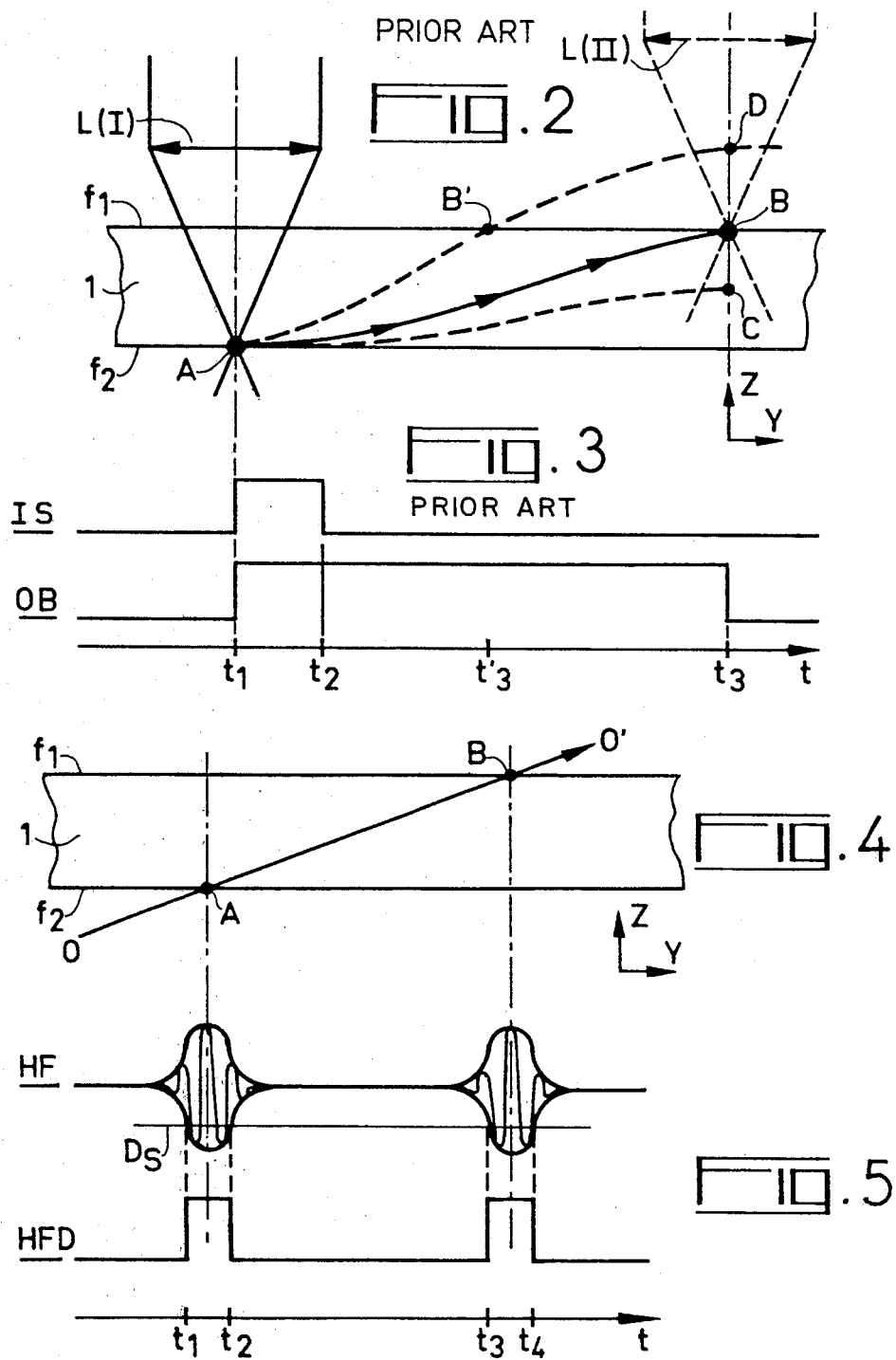

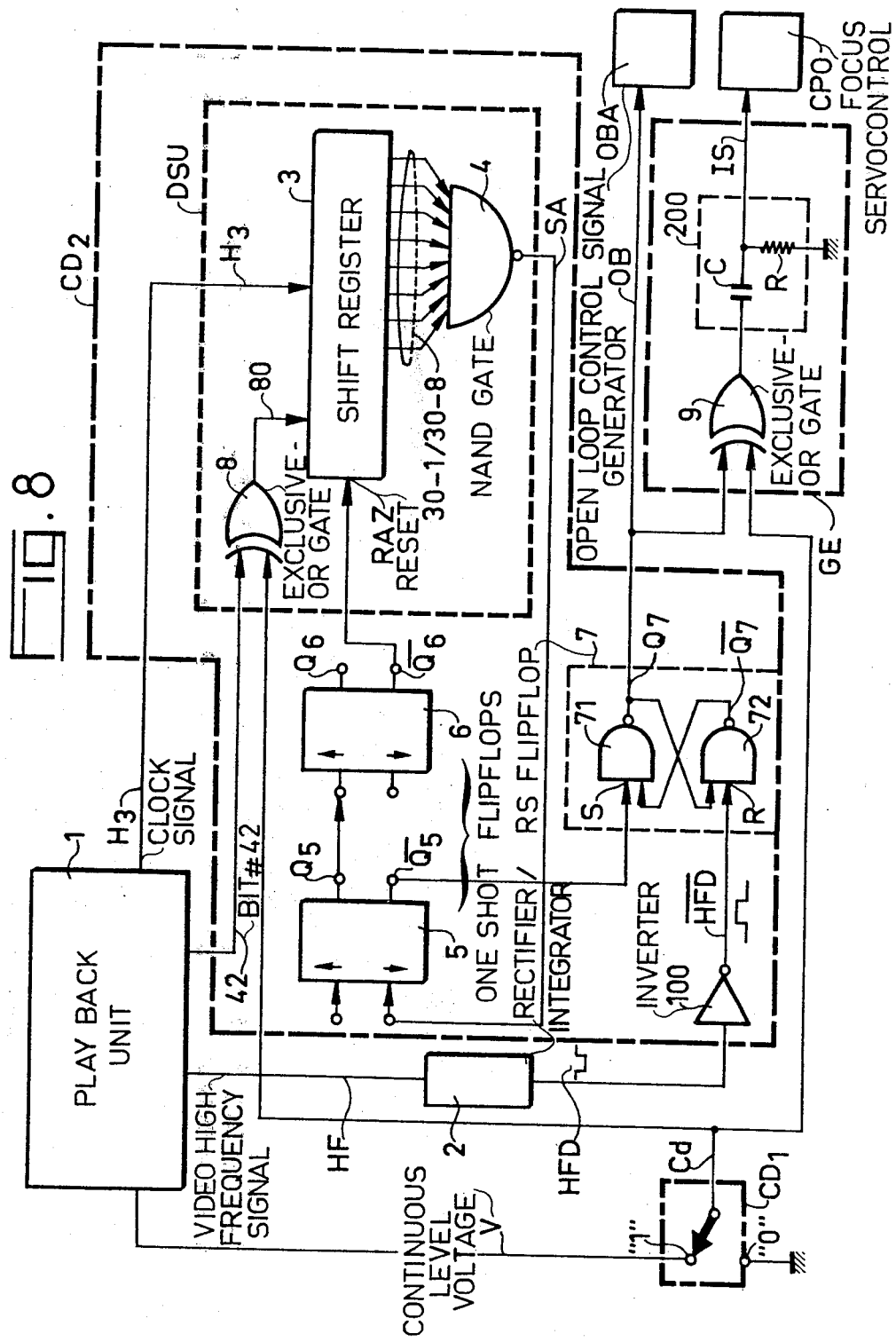

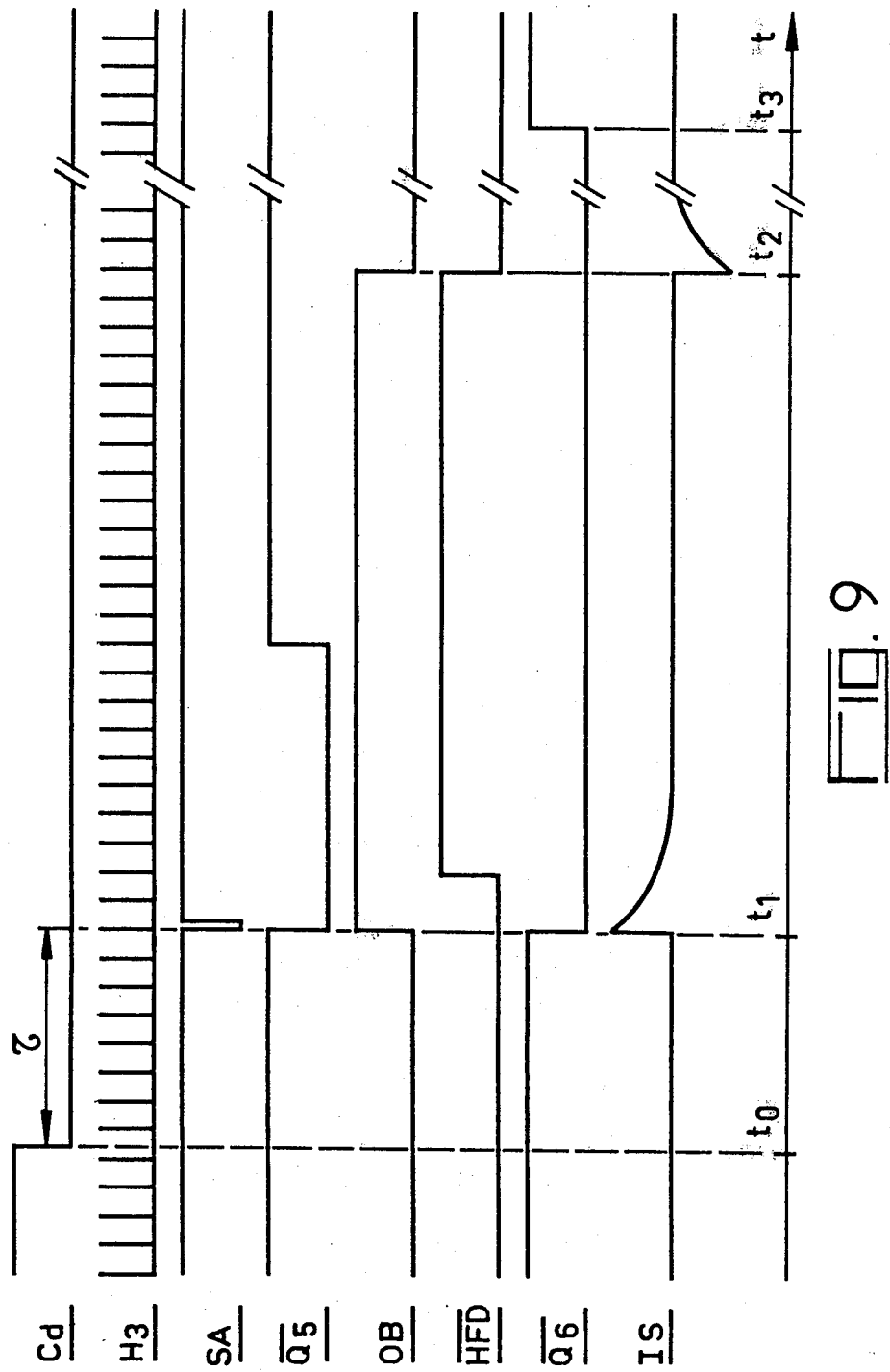

SYSTEM FOR CONTROLLING THE CHANGE OF READ SIDE FOR AN OPTICAL READER FOR AN INFORMATION CARRIER

BACKGROUND OF THE INVENTION

The invention relates to a system for controlling the change of the read side for an optical reader for an information carrier or data medium and in particular a video disk.

It is known that information recorded on one or both sides of a transparent video disk can be read by means of a light beam, for example from a laser, which can be focused onto the recorded surface by appropriate optical means. Photoelectric cells positioned below the disk receive the light diffracted by the recording constituted, for example, by small holes, thus supplying an electrical signal modulated by the information recorded on the disk.

In the case of a video disk carrying information recorded on its two sides, in order to read side 2 ($f_2$) it is merely necessary to transfer the focusing point to the face 2 ($f_2$) by moving for example the optical focusing system in a direction perpendicular to the disk plane. Under these conditions, the light spot attains suitable dimensions to enable it to accurately read the small holes forming the recording on side 2 ($f_2$), but is much too large to be influenced by the recording on side 1 ($f_1$). In practice, it is merely necessary to displace the focusing point in an appropriate manner to immediately change from reading one of the sides of the disk to reading the other side without having to turn over the disk, as is the case in most double-sided disk systems (e.g. audio disks).

It is also known that the correct focusing of the light beam is usually obtained by means of a focus servocontrol having a feedback loop which maintains constant the distance between the optical device and the recorded surface of the disk. The connection and maintenance in place of the servodevice are obtained by the detection of the electrical signal corresponding to the recording.

The simplest way of changing focusing and therefore reading from one side to the other, consists of opening the focusing servodevice loop for a predetermined time T and imparting on the focusing device a translation movement corresponding to the displacement from one disk side to the other. This translation movement is obtained by applying to the focusing device a current pulse which is correctly calibrated in time and amplitude in such a way that the device is displaced precisely by the thickness of the disk for time T. At this time, it is merely necessary to close the focusing servodevice loop again for the latter to be connected to the opposite side. However, this very simple process does not give satisfactory results under practical conditions.

The translation movement from one side to the other involves two phases. During the first phase, the focusing device performs a movement which is uniformly accelerated throughout the current pulse time, whereas during the second phase the device performs a ballistic movement which is a function of the speed acquired during the first phase. However, this speed, as well as the travel during the first phase is dependent not only on the acceleration applied to the focusing device by means of the calibrated pulse, but also depends on the initial displacement speed of the device at the time of applying the current pulse. As it is a looped servosystem constantly correcting the focusing error, this initial speed is rarely zero and algebraically is added to the speed imparted to the focusing device, which has the effect of increasing or reducing the translation movement imparted to the focusing device during time T.

Moreover, through gravity acceleration, the translation movements of side 1 towards side 2 or from side 2 towards side 1 differ. Finally, other parameters can influence this translation movement, i.e. friction between the mechanical parts of the focusing device can vary as a function of temperature, humidity or other difficult to control parameters.

It is therefore difficult and relatively unreliable to pass from one side to the other by a process which consists of allocating a predetermined time to the change of side.

BRIEF SUMMARY OF THE INVENTION

The present invention obviates these disadvantages by a system for changing the read side for an optical reader of a carrier of information recorded on both sides. The reading is effected by means of an optical device focusing a light beam onto the particular side chosen beforehand, with the optical device having focusing control circuits incorporating a feedback loop in order to maintain constant the distance between the optical device and the surface of the support by servoaction on an electrical signal. The read out recorded information supplies a high frequency modulated electrical signal to detection means for receiving the high frequency modulated electrical signal. The detection means supplies a detected signal in the form of a binary signal assuming a first logic level when the amplitude of the high frequency modulated electrical signal exceeds a predetermined threshold and a second logic level when the amplitude of the high frequency modulated electrical signal is below the threshold. A first control means generates a binary signal for controlling the change of read side, whose two logic levels represent the two sides to be read and a second control means combines the detected signal and the binary signal for controlling the change of read side for creating a feedback loop opening/closing binary signal which can assume a first logic level controlling the opening of the feedback loop after receiving a transition of the signal controlling the change of the read face and a second logic level controlling again the closing of the feedback loop after receiving a transition of the detected signal from the second to the first logic value. A side jump control pulse generator connected to the outputs of the first and second control means supplies the focusing control circuit with a side jump control pulse in synchronism with the transitions of the feedback loop opening/closing signal with the polarity of the control pulse being selected in such a way that it alternately imparts to the optical focusing device an accelerated movement towards the preselected side during the transition from the first to the second logic level of the feedback loop opening/closing signal and a decelerated movement during the return to the first logic level. This permits focusing onto the selected side.

BRIEF DESCRIPTION OF THE DRAWINGS

The invention is described in greater detail hereinafter relative to non-limitative embodiments and the attached drawings, wherein it is shown:

FIG. 2 and the chronogram of FIG. 3 detail a first process for controlling the change of reading side according to the prior art.

FIGS. 4 and 6 and the chronograms of FIGS. 5 and 7 show the arrangements according to the invention.

FIG. 8 is a system for controlling the change of read side according to the invention.

FIG. 9 is a chronogram relative to FIG. 8.

DETAILED DESCRIPTION OF THE PREFERRED EMBODIMENTS

Figure 1:
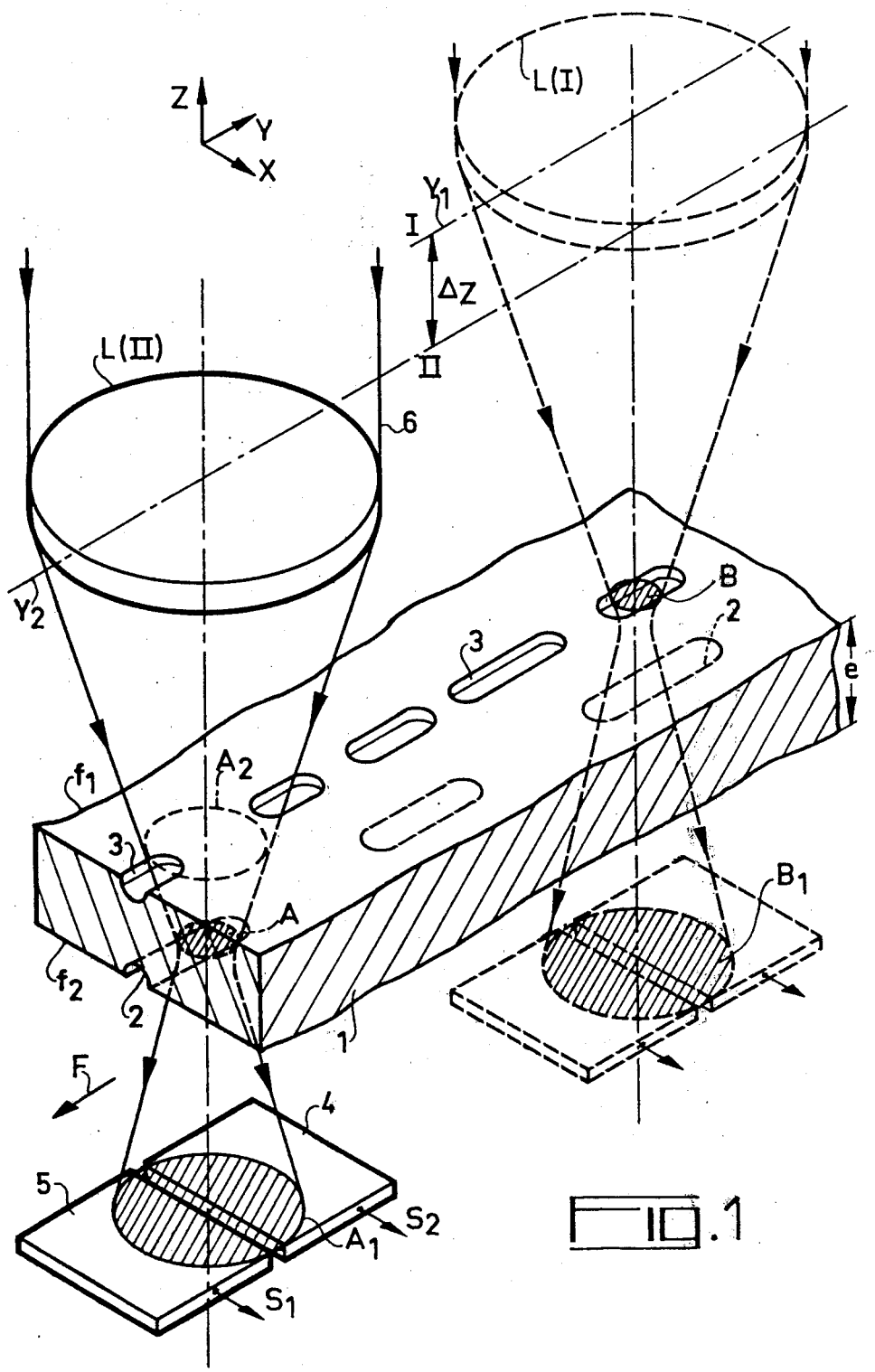
FIG. 1 shows the mechanism for reading the transparent video disk recorded on both sides.

FIG. 1 illustrates the optical reading mechanism for a transparent video disk recorded on both its sides. The focusing device and the recording process of cutting holes on a video disk are well known in the art. This device and process do not fall within the scope of the invention, but the basic principles are mentioned. A light beam produced by a laser (not shown in FIG. 1) is focused onto one of the sides (e.g. side $f_2$) of a video disk by means of an optical system symbolized by lens L in position II, the optical centre of said lens L (II) being positioned on an axis $Y_2$ parallel to axis Y of the reference trihedron XYZ shown in FIG. 1. FIG. 1 shows a portion of a transparent video disk which has concentric tracks with small holes 3 on side $f_1$ and 2 on side $f_2$. These small holes represent coded information. The reading of this information is carried out by focusing the beam 6 onto the holes. In FIG. 1, this focusing is illustrated by spot A. The light beams are then diffracted by the small holes and then detected by photoelectric cells 4 and 5, whose outputs $S_1$ and $S_2$ are connected to the inputs of a not shown differential amplifier. The diffraction spot in the plane of cells 4 and 5 is illustrated in FIG. 1 by reference $A_1$. The beam, focused on side $f_2$ forms a spot $A_2$ on side $f_1$, whose dimensions are much larger than the dimensions of the small holes 3 on said side. The light beams focused onto side $f_2$ are not therefore disturbed by the holes 3 on traversing said side. Under these conditions, the recording of side $f_1$ has no influence on the electrical signal supplied by the cells 4 and 5 positioned beneath the disk.

Therefore, when it is desired to read the information recorded on side $f_1$, it is merely necessary to focus beam 6 onto that side. This focusing is carried out by displacing the focusing device and in particular the optics L by a distance $\Delta Z$ to pass from position II to position I parallel to reference axis Z. It is pointed out that the video disk performs a rotary movement which, in the vicinity of focusing spot A, means a movement substantially parallel to axis Y. This movement is symbolized in FIG. 1 by arrow F. During the time necessary for the displacement of lens L from position II to position I, as the disk continues to revolve (and the small holes continue to pass beneath the reading beam) the light beam is focused at B. The relative positions of video disk 1 and the focusing device in position II are illustrated in the right-hand part of FIG. 1 by dotted lines. It is obvious that the movement of the focusing device takes place in accordance with the single axis Z and that the detectors remain stationary in space. The optical centre of lens L (II) is now located on axis $Y_1$. Since henceforth, focusing is on side $f_1$, the light beams are diffracted at $B_1$.

No matter whether focusing is on side $f_1$ or side $f_2$, as the video disk effects a rotary movement the photoelectric cells 4 and 5 will now detect a high frequency signal modulated respectively by holes 3 or 2. This signal is used on the one hand for the reading of the information and on the other for opening or closing the feedback loop of the servomechanism. To do this, the high frequency signals are detected. This process is well known to the expert and will not be described here.

FIGS. 2 and 3 illustrate the previously described process for changing the read side according to the prior art. It is assumed that at time $t_1$, the focusing device is maintained on side $f_2$ of video disk 1. On wishing to change the read side, the feedback loop of the servomechanism is opened by means of the signal OB passing from a logic state 0 to a logic state 1. This signal has a time T equal to $t_1t_3$. At time $t_1$, a calibrated pulse IS is applied to the members controlling the displacement of the focusing device for a time equal to $t_1t_2$. This pulse serves to impart to the focusing device a translation movement towards side $f_1$, which it is assumed to reach at point B at the end of a time T equal to $t_1t_3$. At said time $t_3$ it is merely necessary to close again the feedback loop of the focusing servomechanism for the latter to be linked with the new read side, i.e. side $f_1$. During a first phase corresponding to pulse IS the focusing device symbolized by optics L(I) effects a uniformly accelerated movement towards position (II). However, the speed acquired during this first phase is dependent not only on the acceleration applied to the focusing device by means of the calibrated pulse, but also depends on the initial displacement speed of said device at time $t_1$. This initial speed is algebraically added to the speed acquired. Thus, in certain conditions, the focusing device moves more or less rapidly than the displacement speed corresponding to the average trajectory, AB. In the case of a higher displacement speed, the trajectory AB'D is obtained during time T, whereas with a lower displacement speed trajectory AC is obtained. It follows that in the first case, the crossing of side $f_1$ is effected at point B', i.e. at time $t'_3$, whereas in the second case at time $t_3$ point A is at C and has not yet crossed side $f_1$. Points D and C are too far away from side $f_1$ to obtain a rapid and correct connections of the focus servomechanism on video disk side $f_1$ on closing again the servomechanism feedback loop.

The invention will now be described relative to FIGS. 4 to 7.

In FIG. 4, it is assumed that the servomechanism feedback loop is open and a ballistic movement is imparted to the focusing device making it successively cross the two sides of the disk $f_1$ and $f_2$, as represented by the straight line AB on axis OO'. It is pointed out that when the focusing point arrives in the vicinity of and then crosses a recorded side of the disk, a group of modulated signals, which will be called hereinafter high frequency signals, shown in FIG. 5 on line "HF" is collected at the output of the not shown differential amplifier connected to the reading cells 4 and 5 of FIG. 1. By known electronic means, it is possible to detect these signal groups and to transform them into pulses as shown on line "HFD" of FIG. 5. These electronic means are known and are generally used in video disk readers to permit the initial attachment of the focusing servomechanism. Detection comprises a rectifying operation and an integrating operation. Pulse "HFD" has a logic level 1 during times $t_1t_2$ and $t_3t_4$. The durations of these times are accurately determined by a threshold logic $D_S$, which is made sufficiently high to eliminate possible undesired noise signals and discriminate without ambiguity the appearance of the high frequency signal.

Figure 6:
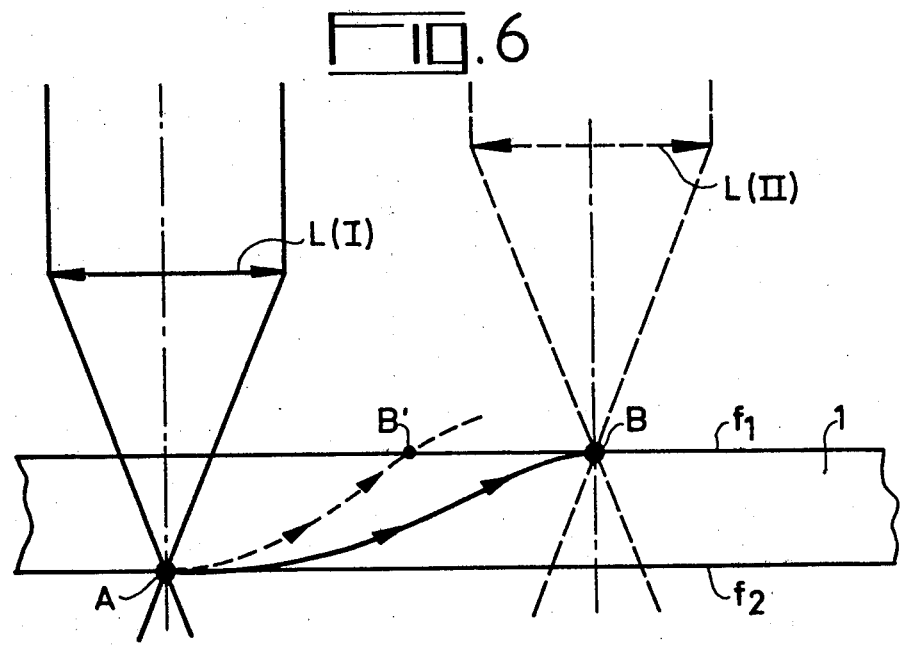
Figure 7:
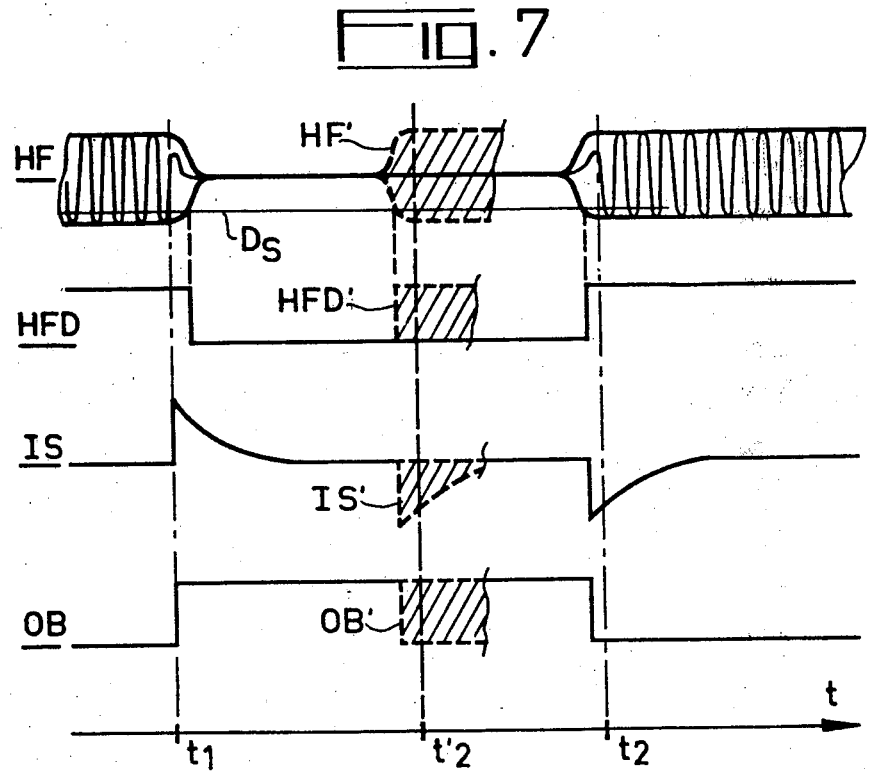

On the basis of the above, the operation of the read face changing system according to the invention will be described relative to FIGS. 6 and 7.

It being assumed that reading is taking place on side $f_2$ at a random time $t_1$, the loop of the focusing servomechanism is opened by means of signal OB simultaneously with the application thereto of a brief side jump control pulse IS. As a result of said pulse, the focusing point leaves video disk side $f_2$ at point A and moves towards side $f_1$ following a trajectory AB, which has the effect of extinguishing the high frequency signal HF for reading side $f_2$ and changing the detected signal HFD, when the high frequency signal drops below the predetermined threshold $D_S$. The focusing point crosses side $f_1$ at B. Just before reaching the point B the high frequency signal HF starts to increase again to reach the threshold $D_S$. The detected signal HFD then changes again and in turn this transition leads to the change of signal OB and the closing of the focusing servomechanism feedback loop causing the attachment of the latter to the disk side $f_1$. In synchronous with the closing of the loop, a decelerating or braking pulse is transmitted to the focusing device to prevent a ballistic overshoot of point B, said pulse having the opposite polarity to the acceleration pulse.

If it is assumed that for some reason the focusing point is not displaced in accordance with the trajectory AB, but for example in a faster manner in accordance with trajectory AB' the crossing of side $f_1$ takes place at time $t'_2$. The rise of the high frequency signal becomes effective just before said time $t'_2$, bringing about the change of signal HFD and signal OB, whilst leading to the production of a decelerating pulse IS. This merely shortens the time T necessary for the passage from side $f_2$ to side $f_1$ of the video disk. However, in all cases, the decelerating and loop closure control signals have been transmitted precisely at the time when the focusing point arrived in the immediate vicinity of side $f_1$.

The procedure on changing from side $f_1$ to side $f_2$ comprises exactly the same stages and it is merely necessary to reverse the respective directions of the decelerating and accelerating pulses. These pulses can be produced very simply by differentiation of the loop opening/closing signal OB or its compliment.

In the read side changing control system according to the invention, it is merely necessary to adjust the amplitude of the accelerating and decelerating pulses of IS (which are always identical in shape and amplitude, but reversed with respect to one another). This adjustment is not very critical and it is merely necessary to attempt to obtain the shortest side change time T which is compatible with a reliable operation of the read side control system. Experience has shown that an average time T of approximately 1.5 ms for a disk of thickness 150 microns gives a very stable operation of the system.

For the system to operate correctly, it is also necessary to have information making it possible to recognize the read side. Thus, the servomechanism functions absolutely reliably when the disk has no recording on one of the sides, with the other side having no signal, so that it is not possible for the focusing servomechanism to be connected therewith. This is not the case if the two sides of the disk carry recorded information when each of the sides can supply a modulated electrical signal, so that the servomechanism can be attached either to one or other side without it being possible to differentiate them, particularly during the initial attachment. In addition, under the influence of transient unwanted signals, there can be an untimely change of the read side. In this case, assuming that the previously read side was side $f_1$, the servomechanism remains connected to side $f_2$ and the read information consists of that recorded on side $f_2$.

In order to prevent this ambiguity, it is possible to use all processes and devices permitting the recognition of the read face. A particularly advantageous process when the sound track of a television signal is recorded in digital form is referred to hereinafter. This recording can consist of 40 bits. According to this read face recognition process, one bit is added to the bit train representing the sound track. By convention, the bits of the sound track carry numbers from 1 to 40. A supplementary bit identifies the read side. This bit is permanently carried at logic level 0 for one of the sides and at logic level 1 for the other side. This bit, as well as the sound bits, are recorded during the line scanning return time. For the requirements of the present invention, this supplementary bit representing the read side is transmitted to the read side change control system.

FIG. 8 describes a preferred construction of the read side change control system according to the invention. Reference numeral 1 represents the conventional circuits of a video disk reader, as well as the associated synchronization and clock circuits supplying in particular the clock $H_3$ at the line scanning frequency necessary for the read side control device shown in FIG. 8 and designated by the reference DSU. These circuits also supply the supplementary bit representing the read side to connection 42, as well as the high frequency signal HF resulting from the reading of the recorded information on one or other side with a direct current voltage V representing the logic level 1 according to the integrated circuit standard used. The latter voltage is in the case of the so-called "TTL" standard 5 volts.

The side change control system according to the invention essentially has three circuits. A first control circuit $CD_1$ produced a binary signal Cd for controlling the change of read side, a second control circuit $CD_2$ producing the loop opening/closing signal OB and a generator GE producing a side jump control pulse IS. Circuit $CD_1$ may simply comprise a bidirectional switch alternately connecting output Cd to a logic value 1 (V) or a logic value 0 (symbolized by the circuit earth). The supplementary bit identifying the read side reaches an input of the EXCLUSIVE-OR gate 8, whose other input receives the other control signal Cd. As a function of the position of the side selection switch of control circuit $CD_1$, said gate 8 permits the passage without change of the supplementary bit, which is the case for example with side $f_1$ for which by convention this bit is always at 0 or, which is the case with side $f_2$ where the supplementary bit is always at 1, gate 8 reverses the bit. The output of the EXCLUSIVE-OR gate 8 is transmitted to the series input of a shift register 3 having 8 parallel outputs (30-1/30-8). When correctly positioned on the desired side by $CD_1$, the input of shift register 3 only receives 0 (apart from possibly a few erroneous bits due to alterations which have occurred during the transcription process). The parallel outputs 30-1 to 30-8 are transmitted to the corresponding inputs of a NAND gate 4. The output of the latter gate always remains at state 1. For this not to be the case with the present read side recognition process it would be necessary to have 8 consecutive errors for this output to pass to state 0, naturally in the absence of a read side change control.

If when positioned on one of the sides of the disk under stabilised reading operating conditions, switch $CD_1$ is moved from one position into the other, which is the case on the chronogram of FIG. 9 at time $t_0$, via gate 8 the changing of the switch brings about a change in the state of consecutive supplementary bits reaching the input 80 of shift register 3. It is then a succession of bits, all at level 1, which enter the register. At the end of the 8th consecutive bit at level 1 entering register 3, i.e. at the end of the indicated time, the latter has a level 1 on all the outputs 30-1 to 30-8 which brings about the change from state 1 to state 0 of output SA of gate 4. This change of state trips a one-shot flip-flop 5 which, by its reversed output $Q_5$ brings about the tripping of a type S bistable flip-flop 7 formed by two NAND gates 71 and 72. Output $Q_7$ of this flip-flop supplies the opening/closing signal of feedback loop OB. The high frequency signal HF from the reading of the recordings representing the recorded information are detected, i.e. rectified and integrated by a circuit 2 supplying a detected signal HFD, inverted by inverter 100 and transmitted to the input R of bistable flip-flop 7. Circuit 2 also has a threshold logic for eliminating noise. The exclusive OR gate 9 and the differentiating circuit RC serve to supply side jump and decelerating pulses of appropriate polarity. Thus, when $CD_1$ is positioned on side $f_1$, the circuit can only supply pulses permitting a jump from side $f_2$ to side $f_1$, whilst when $CD_1$ is positioned on side $f_2$ the EXCLUSIVE-OR gate 9 is inverted and the pulses supplied only permit passage from side $f_1$ to side $f_2$.

Bistable flip-flop 7 is controlled by output $Q_5$ on the one-shot flip-flop 5 at its input S and signal HFD at its input R. However, if the passage to zero of output $Q_5$ of one-shot flip-flop 5 causes the passage to 1 of output $Q_7$ of bistable flip-flop 7, said state remains transient for as long as input R has not passed to state 1. However, this is only obtained when, under the effect of jump pulse IS, the focusing point of the reading device has moved far enough away from the recording of the side that it should be removed. Thus, the control on input S must be maintained for a sufficiently long time (approx. 500 ms), which is the object of the one-shot flip-flop 5. In turn, one-shot flip-flop 6 serves to prevent access to register 3 of necessarily incorrect supplementary bits, which arrive during the passage time from one side to the other and thus prevents the production of incorrect pulses SA. This one-shot flip-flop 6 produces pulses of a sufficient length to permit the different servomechanisms to be stabilised on the new side after each jump (appox. 100 to 250 milliseconds). The resetting input (RAZ) of register 3 is connected to output $Q_6$ of one-shot flip-flop 6. Thus, further changes of side cannot take place until this time has elapsed.

Throughout the operating time of the apparatus, the read side control device DSU permanently ensures that the focusing servomechanism is correctly positioned on the selected disk side. If this were not the case, supplementary bits would arrive at state 1 on input 80 of shift register 3 and at the end of the 8th consecutive bit in state 1 would automatically initiate the aforementioned side change process. This is particularly useful for the automatic positioning of the reading device on the selected side during a change of bit.

FIG. 9 is a chronogram illustrating the main signals encountered in the side change control system of FIG. 8. By tripping the switch of control circuit $CD_1$ at time $t_0$ the output signal Cd passes from state 1 to state 0. It follows that at the end of 8 clock pulses $H_3$ and therefore 8 successive comparisons, the output SA of NAND gate 4 passes from state 1 to state 0, causing the tripping of one-shot flip-flops 5 and 6. The inverted input $Q_6$ is connected to a resetting input RAZ of shift register 3, thereby reinitiating the shift register at time $t_1$. Output SA reassumes logic state 1. At the same time $t_1$, the opening/closing signal of loop OB assumes logic value 1, thus controlling the opening of the feedback loop of the servomechanism OBA. This transition leads to the generation of a positive side jump control pulse IS. As this pulse is obtained by differentiation of the output signal of the EXCLUSIVE-OR gate 9, said pulse has a decreasing exponential shape and is transmitted to the positioning control circuit of focusing device CPO. Thus, the focusing point leaves the read side and moves towards the other side, bringing about the disappearance of the high frequency signal HF and its detected signal HFD. This signal reappears at time $t_2$ just before the focusing point reaches the other side. The reverse process occurs and signal OB reassumes logic value 0 and leads to the generation of decelerating pulse IS of opposite polarity to the previously generated pulse. The one-shot flip-flop 6 reassumes its state of equilibrium at time $t_3$.

As non-limiting examples, the following integrated circuits marketed by TEXAS INSTRUMENTS can be used for the read face change control system of FIG. 8:

| | |
|---|---|
| Shift register with series input and parallel outputs (3) | SN 74164 N circuits |
| EXCLUSIVE-OR gates (8, 9) | SN 7486 N circuits |
| Inverter (100) | SN 7404 N circuits |
| NAND gate (4, 71, 72) | SN 7430 N circuits |
| One-shot flip-flops | SN 74123 N circuits |

The differentiating circuit 200 can be constituted by a typical 10 KΩ resistor and a capacitor of typical value 10,000 pF.

What is claimed is:

1. In an optical reader system for changing the read side of a carrier of information recorded on both sides, said reader system having an optical focusing device for focusing a light beam onto a designated one of said both sides and focusing control circuit with a feedback loop in order to maintain a constant distance between said optical device and the surface of said carrier by servoaction on an electrical signal, the improvement comprising:
   detection means for receiving a high frequency modulated electrical output signal read off said carrier by said optical reader and supplying a detected signal in the form of a first binary signal of a first logic level when the amplitude of said high frequency modulated electric signal exceeds a predetermined threshold and a second logic level when the amplitude of said high frequency modulated electrical signals is below said threshold;
   first control means for generating a second binary signal for controlling the change of read side having two logic levels representing the two sides to be read;
   second control means combining said first binary signal and second binary signal for controlling the change of read side for creating a feedback loop opening/closing binary signal which can assume a first logic level controlling the opening of the feedback loop after receiving a transition of said second binary signal controlling the change of reading sides and a second logic level controlling the closing of said feedback loop after receiving a transition of the first binary signal from the second to the first logic level; and a side jump control pulse generator connected to the outputs of said first and second control means for supplying said focusing control circuit with a side jump control pulse in synchronism with the transitions of said feedback loop opening/closing binary signal with the polarity of said jump control pulse being selected so that it alternately imparts to said optical focusing device an acceleration movement towards the preselected side during the transition from said first to said second logic level of said feedback loop opening/closing binary signal and a decelerated movement during the return to said first logic level thereby permitting focusing onto the selected side of said recorded information carrier.

2. A system according to claim 1, wherein said second control means further comprises a read face control device which receives at a regular speed and synchronously with the reading of the information recorded on said carrier a state signal which can assume two separate values, each representing one of the two sides of the recording medium, said control device including permanent comparison means for the said read side change control signal, whose output is transmitted to a storage means.

3. A system according to claim 2, wherein the storage means are constituted by a circulating store having a plurality of cells recording in the form of binary coded pulses a predetermined number N of successive comparison results and by combinatory means supplying an output pulse when N successive comparison results are negative and wherein said output pulse is transmitted by a timing means on the one hand to a restarting input of the circulating store and on the other hand to a switching means incorporated in said second control means.

4. A system according to claim 3, wherein N is made equal to 8.

5. A system according to claim 3, wherein said comparison means are constituted by a first logic EXCLUSIVE-OR circuit, said circulating store by an eight-stage shift register, said combinatory means by a logic NAND circuit with 8 inputs and said timing means by two cascade-connected one-shot flip-flops, the output of the second of said flip-flops being connected to a reset input of the shift register.

6. A system according to claim 5, wherein said first control means are constituted by a bi-directional switch selecting at random one of the binary logic values 1 and 0, said switching means being constituted by an RS-type bistable flip-flop which receives at its input S the output of the first of said two one-shot flip-flops and at its input R, via a logic inverting circuit a the high frequency signal, the control pulse generator comprises a second logic EXCLUSIVE-OR circuit receiving at its first input the true output of the RS-type flip-flop and at its second input the output of the bidirectional switch and a circuit RC which differentiates the output signal with respect to the second logic EXCLUSIVE-OR circuit incorporating a resistor and a capacitor.

7. A system according to claim 6, wherein the first of the two one-shot flip-flops supplies a timing pulse maintaining the RS-type bistable flip-flop in a first state for a time exceeding the time necessary for the reduction of the modulated high frequency signal to below the predetermined threshold and wherein the second of the one-shot flip-flops supplies a timing pulse preventing the generation of a pulse at the output of the logic NAND circuit for a time exceeding the time necessary for the focusing control circuits to change the read side.

* * * * *